Jan. 13, 1959   J. W. POWISCHILL ET AL   2,868,400
METHOD FOR FEEDING BULK MATERIAL TO
PLURAL SUPPLY LOCATIONS
Filed June 7, 1955   6 Sheets-Sheet 3
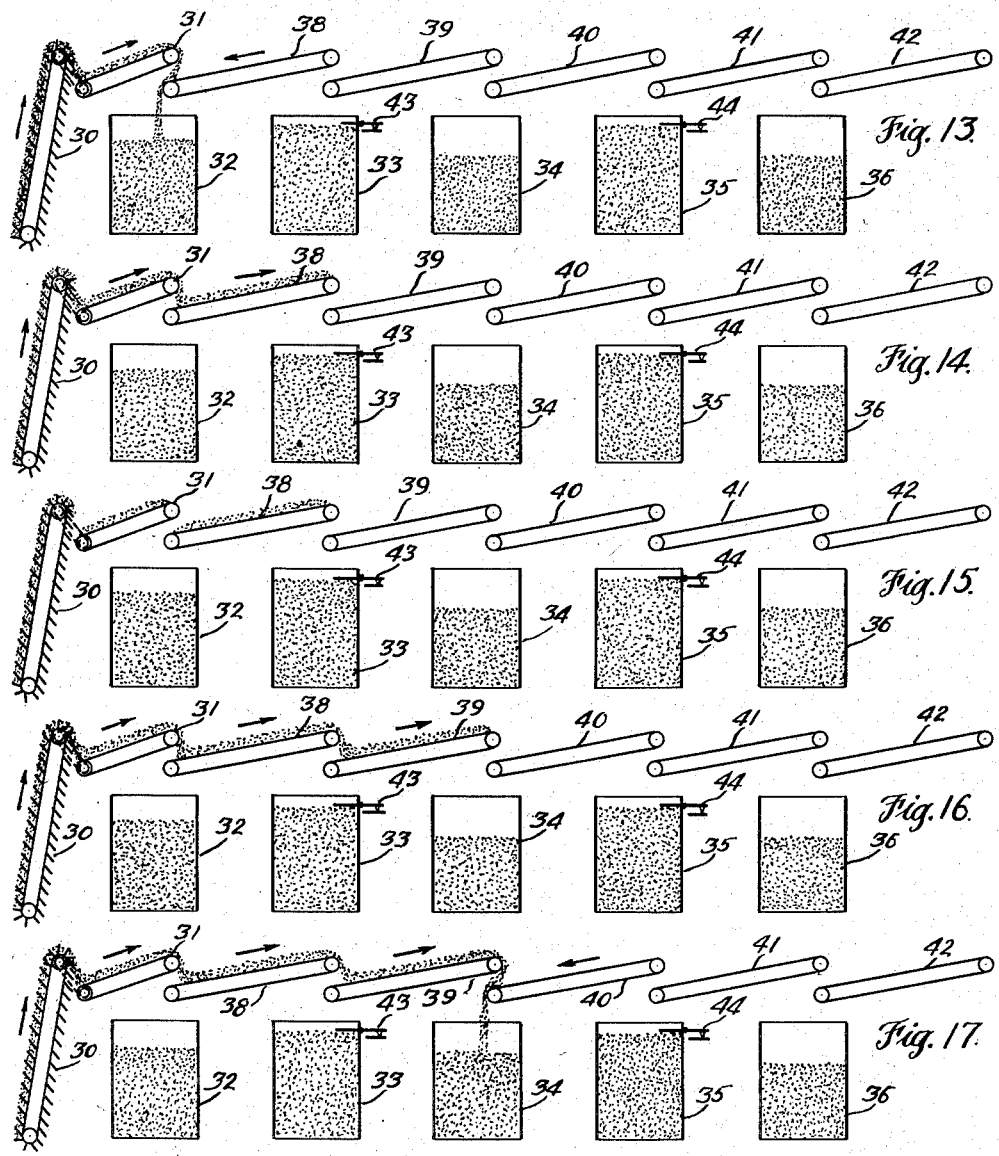
INVENTORS:
JOHN W. POWISCHILL
EDWIN W. HINE II
GEORGE R. HOWARD
BY Howson & Howson
ATTORNEYS INVENTORS:
JOHN W. POWISCHILL
EDWIN W. HINE II.
GEORGE R. HOWARD
By Howson & Howson
ATTORNEYS

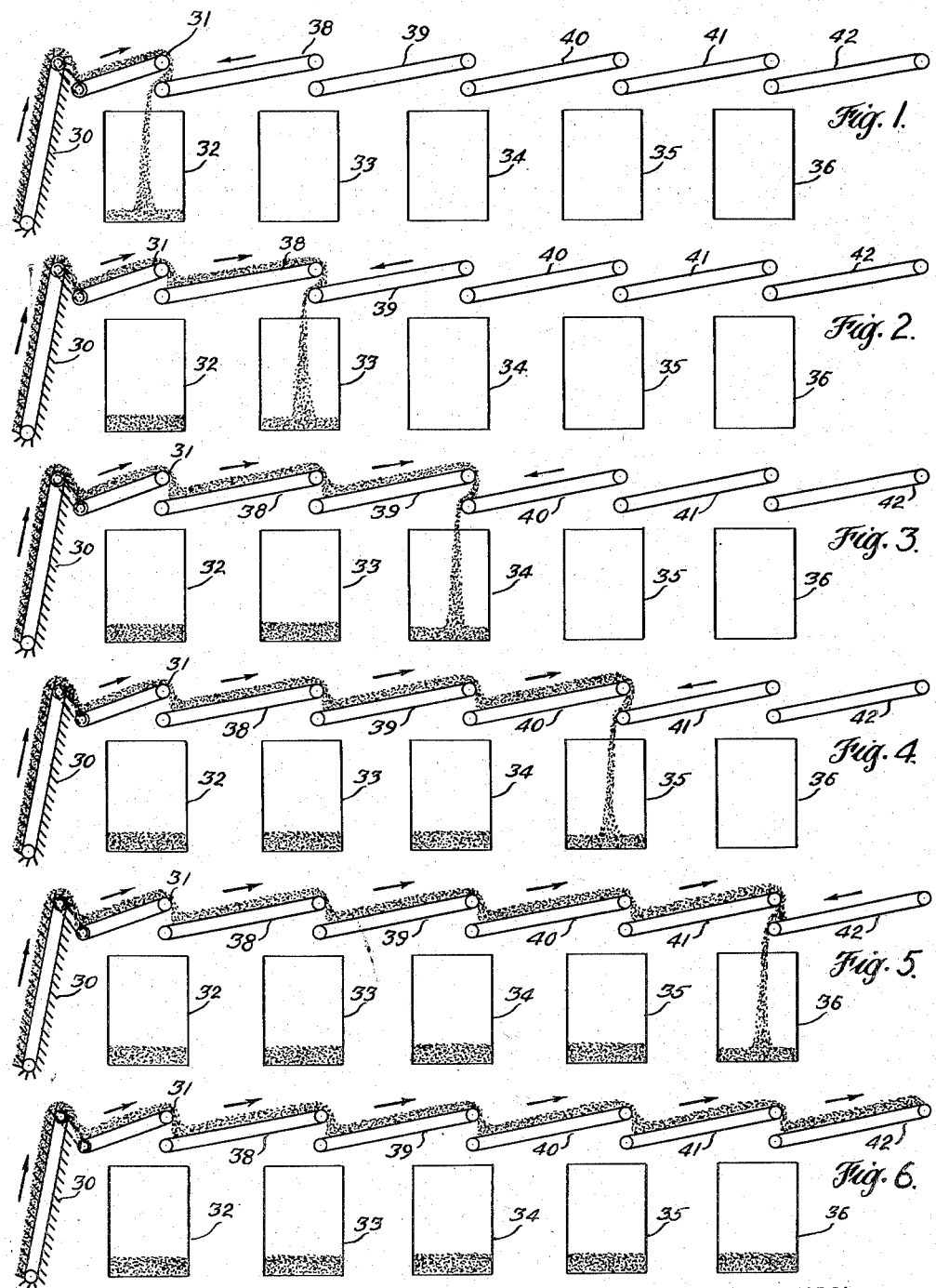

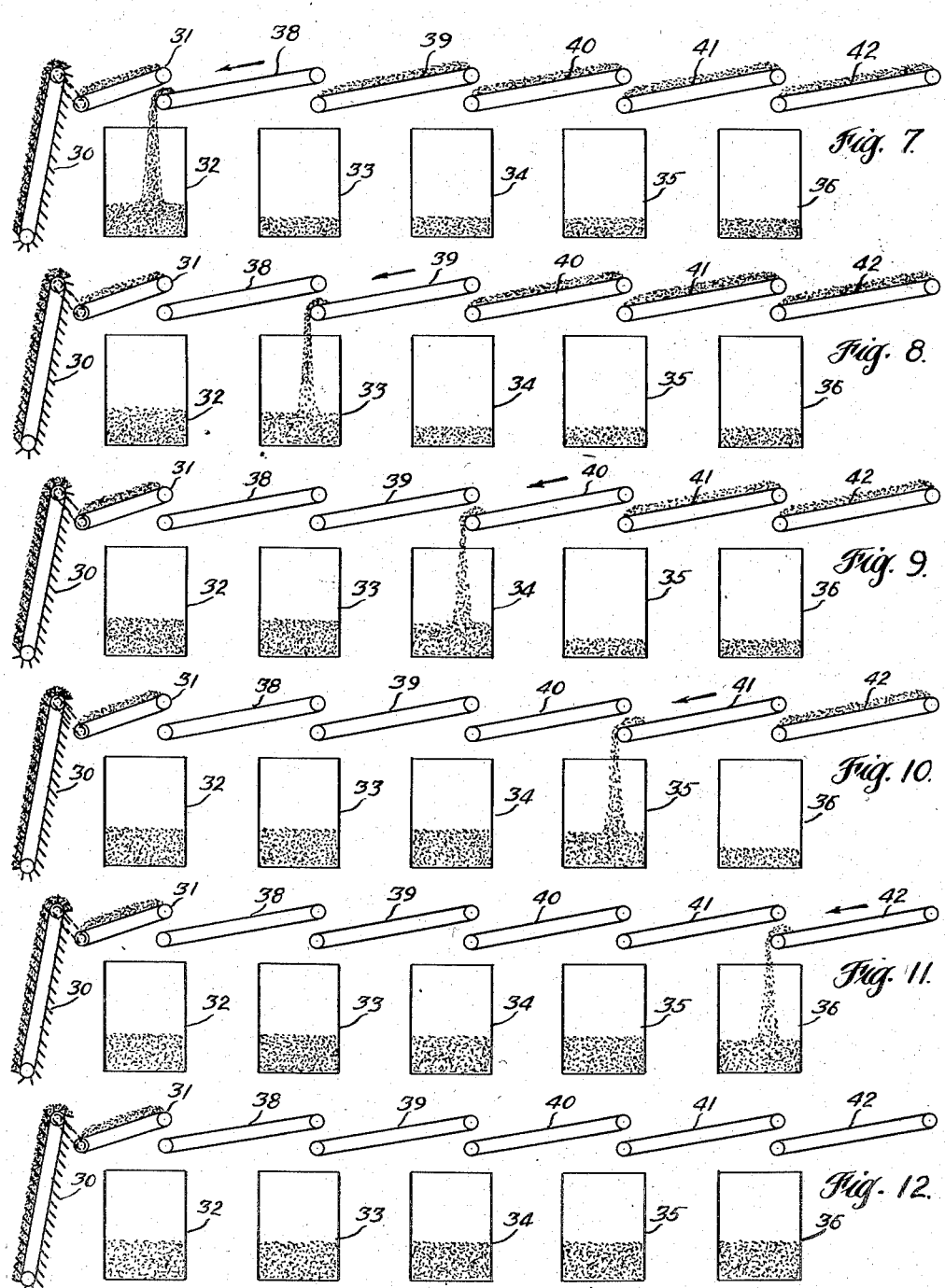

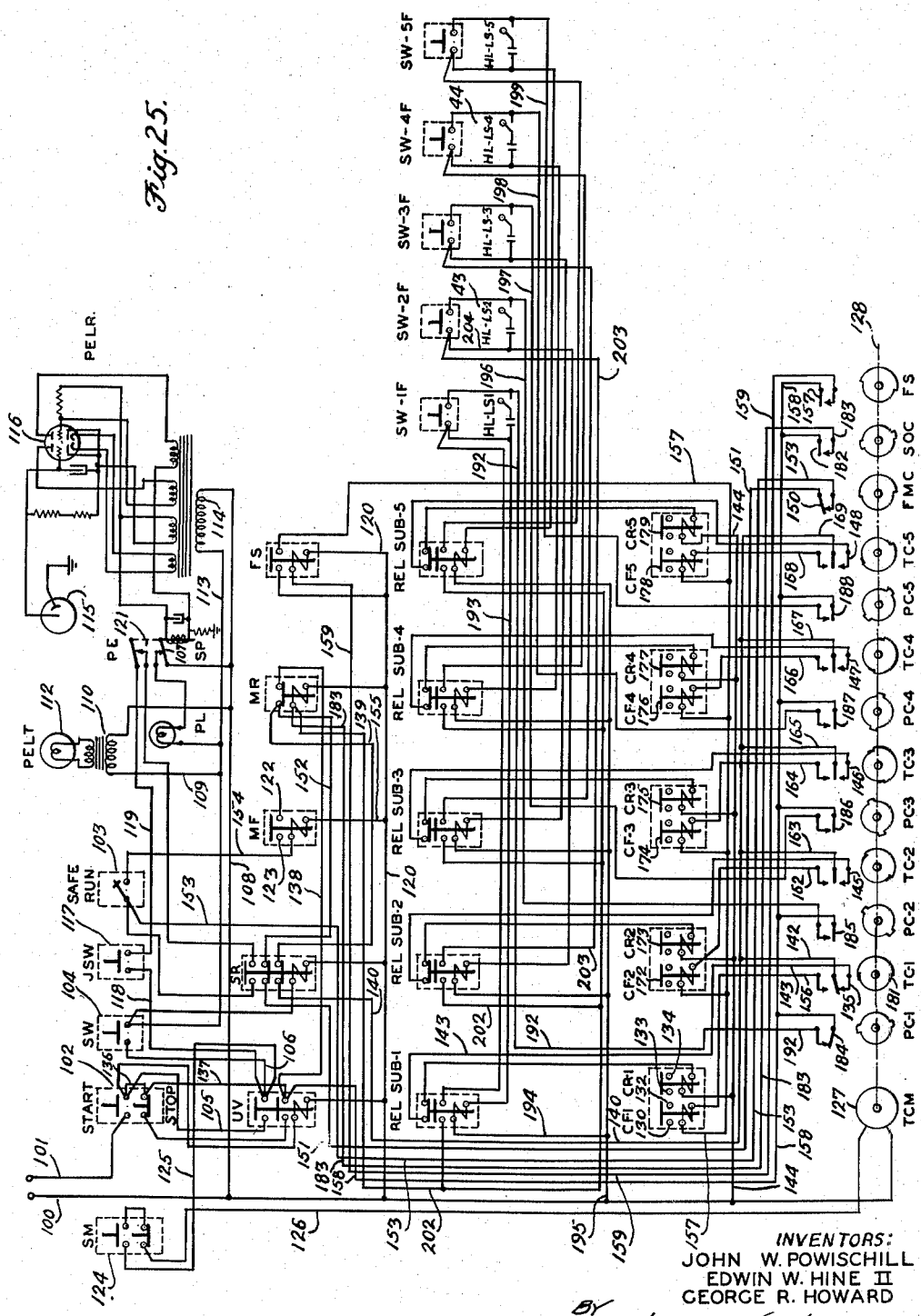

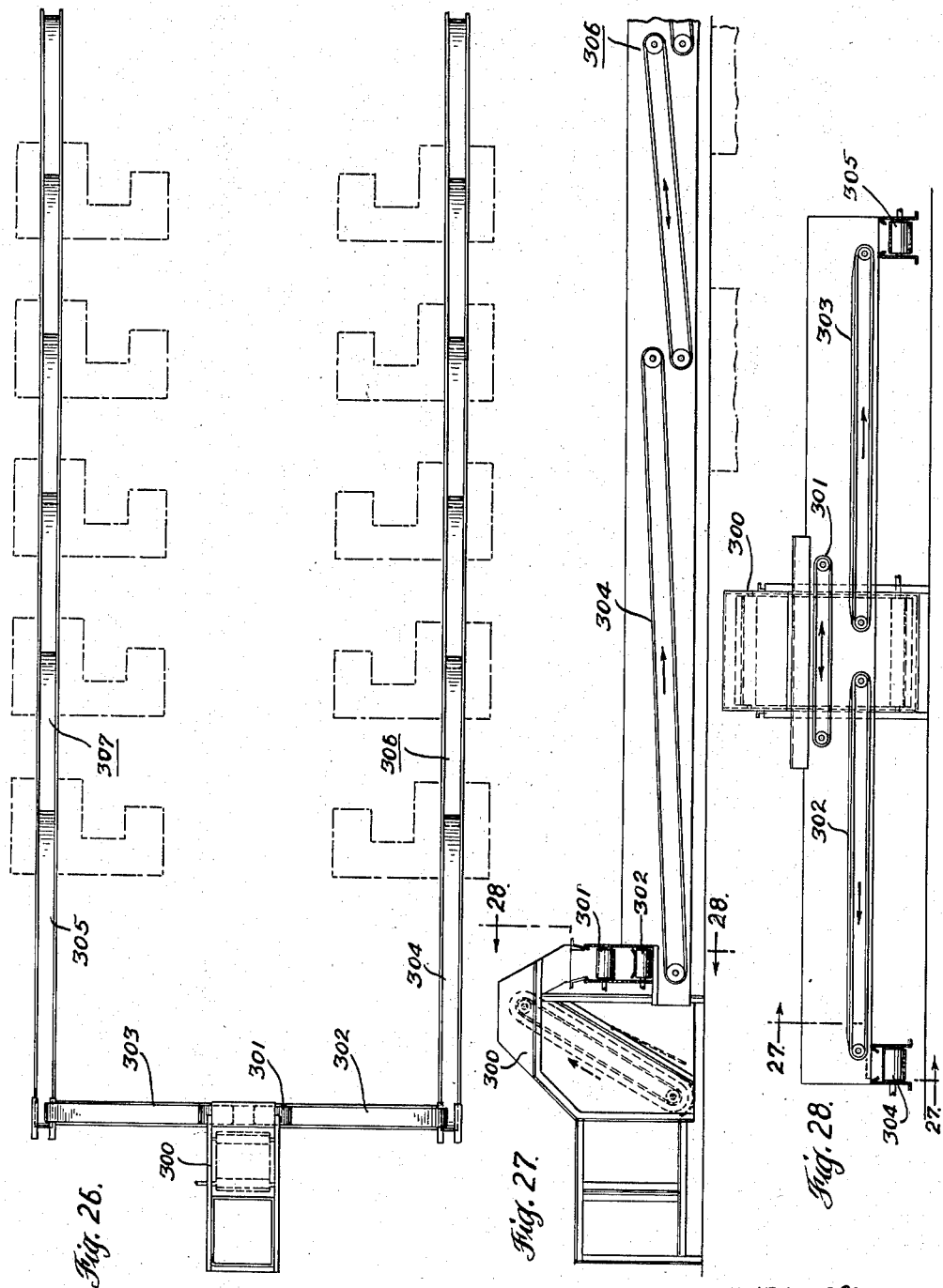

United States Patent Office 2,868,400
Patented Jan. 13, 1959

2,868,400

METHOD FOR FEEDING BULK MATERIAL TO PLURAL SUPPLY LOCATIONS

John W. Powischill, Cheltenham, and Edwin W. Hine II and George Robert Howard, Philadelphia, Pa., assignors to Proctor & Schwartz, Inc., Philadelphia, Pa., a corporation of Pennsylvania Application June 7, 1955, Serial No. 513,684

4 Claims. (Cl. 214—152)

This invention relates to feeding methods and is concerned particularly with the problem of provision of a system for maintaining a reasonably uniform supply of loose, bulk, material at a plurality of similar locations from which it is dispensed in the performance of industrial operations. As an example of a problem solved by the invention, there may be cited the creation and maintenance within the feed hoppers of a plurality of cigarette making machines of a supply of tobacco which is ordinarily dispensed from said hoppers substantially continuously in the manufacture of cigarettes.

The method of the invention may be employed as a solution to a large number of feed and supply problems. Since, however, the primary research on which they are based relates to maintenance of a supply of tobacco at each of a number of cigarette making machines arranged in a spaced arrangement, it will be convenient to discuss the invention primarily in relation to such problems.

In the supplying of tobacco to cigarette making machines from their respective hoppers, there must obviously be maintained in the hopper of each machine a supply of tobacco sufficient to maintain continued operation of the machine. It is well known to persons skilled in this art, however, that this does not constitute the total supply problem, for it is necessary not only to maintain a supply in the hopper, but to maintain such supply at a fairly uniform height and amount, which should vary if at all only within rather narrow limits. This follows from the fact that any substantial variation in tobacco depth in the hopper will necessarily affect the density and quantity of tobacco fed to the cigarette making machine. It is accordingly an object of the invention to provide a feeding system which will ensure maintenance of a virtually constant supply of tobacco at the individual hoppers feeding a plurality of cigarette making machines.

In the past, efforts at maintaining such uniformity of supply have either involved visual inspection together with manual replenishment or control in accordance with the judgment of an operator, or they have involved an effort to accomplish the same type of result automatically, i. e., to feed tobacco to the individual hoppers on a demand basis as feeler or other sensing mechanism indicated the need for replenishment. This type of control is subject to two basic drawbacks. In the first place, it requires a rather complicated mechanical arrangement, and in the second place it does not always respond adequately to demand, particularly when two or more hoppers differently spaced from the primary source of supply demand material simultaneously.

In contrast to these systems the present invention provides an apparatus and process by which the supply may be maintained at each hopper quite simply within closely defined limits, once the basic supply to each hopper and operation of the individual cigarette machines supplied thereby has been established.

A primary feature and object of the invention has been to provide a supply apparatus and method satisfying the requirements of the art as discussed above.

A further object and feature has been the provision of such an apparatus and method in which the hoppers are arranged in serially spaced relation and are incrementally supplied in an established sequence to provide a uniform supply at starting up and during continued operation.

A further object and feature has been that this system continues to operate, in accordance with the established sequence, through repeated cycles until sensing elements associated with one or more hoppers indicate that the amount of material in such hoppers exceeds the desired amount. In continued feeding of material to the hoppers, the feed to such particular hoppers is discontinued until their respective associated machines have been operated to utilize material to an extent which again requires feed supply. However, during this interruption the feed to the remaining hoppers is continued in the established sequence.

Still further objects and advantages of the invention and the manner in which they have been attained will be evident from reading of the following detailed description in the light of the attached drawing, in which:

Figure 1 is a side elevation illustrating the primary apparatus used in practicing the invention, and the step of supplying the first increment of material to the first supply station or hopper;

Figures 2 to 5 are similar views illustrating sequential incremental supply to the second through the fifth hoppers, respectively;

Figure 6 is a similar view illustrating the completion of the first phase of the feeding cycle;

Figures 7 through 11 are similar views illustrating the sequential incremental feeding steps of the second phase of the cycle;

Figure 12 is a similar view illustrating the relationships existing upon completion of the second phase;

Figures 13 to 17 illustrate sequential operations occurring in repetition of the steps of the first phase after tobacco has accumulated at the second and fourth hoppers to a point requiring interruption of feed to those hoppers;

Figure 25 is a diagram of the electrical connections;

Figure 26 is a plan view of a modified and amplified system;

Figure 27 is a side elevation and cross-section of the same form, taken on the line 27—27 of Figure 28; and Figure 28 is a cross-section on the line 28—28 of Figure 27.

Figure 18:
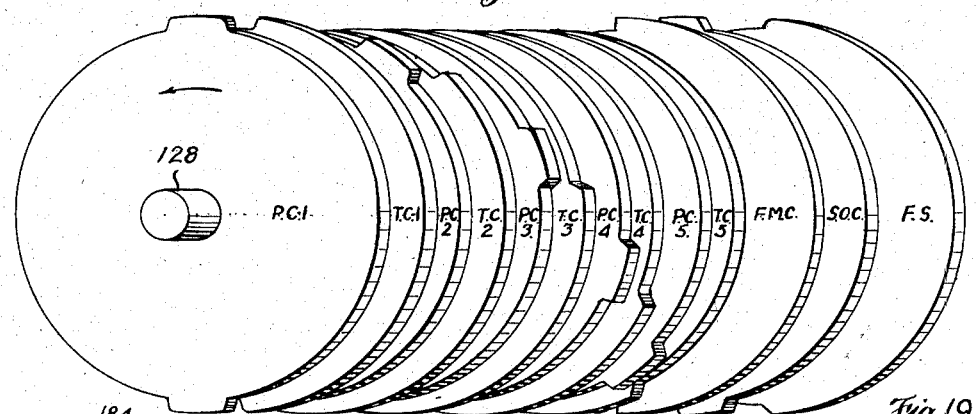
Figure 18 is a perspective view of the arrangement of the control cams on their synchronously-driven shaft.

The process of the invention may best be understood in reference to the performance of its successive steps as illustrated in Figures 1–17 of the drawing. As illustrated in each of these figures, tobacco is fed from a master source of supply by a master conveyor 30 which may be a lattice type vertical spike apron conveyor as familiar in this art. From conveyor 30, the stock is received by an overhead supply conveyor apron 31, by which it is fed to hoppers 32—36 which provide a continuous supply to their respective cigarette making machines, once a basic supply has been established at these hopper locations.

The hoppers 32—36 are serially arranged in a line which receives stock from conveyor 31, and are individually supplied in increments through an overhead conveyor system comprising serially arranged endless conveyors 38—42. Conveyors 30 and 31 are separately controlled as to speed, and are preferably driven by separate electric motors. Conveyor 31 is ordinarily driven at a constant speed, and when it is desired to vary the feed rate to the individual hoppers, this is accomplished by varying the rate of feed of conveyor 30, as by adjustment of a variable speed drive, thereby changing the depth of stock deposited on the uniformly driven conveyor 31 and conveyors 38—42.

Each of conveyors 38—42 is reversibly and independently driven, as by an individual reversible electric motor, and each of them serves, during its movement in reverse, to deposit an increment of stock in the hopper underlying its rear end. As the stock is fed forwardly by conveyors 30 and 31 until it begins to spill over onto the underlying surface of conveyor 38, this conveyor will be driven in reverse by its motor for a timed number of seconds until hopper 32 has received a predetermined increment of stock, as illustrated in Figures 1 and 2. At the end of this timed interval the conveyor 38 is reversed to drive it forwardly, and it serves thereafter as a part of the supply system by which each of hoppers 33—36 is supplied sequentially with an increment of stock, and phase I of the feeding cycle is completed.

It will be seen that each of conveyors 38—42 underlies at its rear end the preceding conveyor, and overlies its respective receiving hopper. Thus after supplying an increment to its underlying hopper, each of them in turn is used as a supply conveyor to provide a continuously operating supply source to succeeding conveyors in the line until phase I is completed. After the first increment has been supplied to hopper 32 and conveyor 38 reversed to feed forwardly onto conveyor 39, this conveyor will be operated in reverse to deposit a similar increment into hopper 33, as illustrated in Figures 2 and 3, and each of conveyors 38—42 will first be similarly operated in reverse for a timed interval sufficient to deposit in its underlying hopper the desired increment, and then forwardly until each hopper has received such an increment and a further increment has accumulated on each conveyor to the condition illustrated in Figure 6, the steps of feeding increments by conveyor 39 to location 33, by conveyor 40 to location 34, by conveyor 41 to location 35 and by conveyor 42 to location 36 being illustrated in Figures 2–5, respectively.

At the completion of phase I and accumulation of stock to the positions of Figure 6, all of the conveyors are stopped and phase II is commenced. As illustrated in Figures 7–12 of the drawing, the master feed and overhead supply conveyors 30 and 31 remain idle during this phase, and each of conveyors 38—42 is operated in reverse to deposit the stock accumulated on its upper surface into its respective underlying hopper 32—36. Like the corresponding steps in phase I, these incremental feeding operations are also preferably performed in serial sequence, as illustrated in Figures 7–12 of the drawing.

The sequence of incremental feeding steps is continued in repeated cycles as described above until stock has accumulated in the respective hoppers in a sufficient amount to justify the starting of the individual cigarette machines, with resulting steady removal of tobacco by the individual machine feeding systems from the respective hoppers. The starting of these machines may be manually controlled, but it is preferably automatically controlled by one or more lower limit switches, which start the machines when the depth of tobacco in the hoppers has accumulated to a minimum desired level for such operation. Until this stage is reached, the feed rate may be relatively rapid, but operation may be adjusted manually or automatically, once operation of the machines has started, to provide a rate of feed by conveyors 30, 31 and 38—42 to the individual hoppers by which stock is supplied to these hoppers at a rate approximately the same as, or just slightly in excess of, that required to make up for stock fed to the machines between successive supply increments.

Thus, the steps of phase I as illustrated in Figures 1–6 and phase II as illustrated in Figures 7–12 will be continued in the same sequence to maintain a regular intermittent supply to replenish each hopper as stock is fed from them for operation of the machines. Since such supply is fairly adjusted to the machine demands, there will be no drastic or sudden change in the supply level within any hopper, once the machines have been started. However, the invention includes as an important feature a provision by which the supply to each hopper is adjusted to the demand of its associated machine. If and when the rate of feed to any one of the machines falls short of the incremental rate of supply to its hopper, the feeding mechanism skips that hopper in its incremental feeding cycle. The need for this may occur by reason of the rate of normal operation of the machines during normal operation in continuous feed of stock to the battery of machines, or because of interruption of the operation of one or more machines, and is illustrated in Figures 13–17 of the drawing.

While the process may be performed with any desired control arrangement consistent with the basic nature of the operation, control of feed to the respective hoppers is preferably accomplished through an upper level limit switch which is installed at each hopper and operates to cause the feeding mechanism to skip the step of incremental feeding to that hopper when its turn is reached in the cycle of operations. Figures 13–17 illustrate operation of the system when the upper limit switches 43 and 44 indicate that stock in their respective hoppers 33 and 35 has reached such level that it is desirable that they be skipped for their turn of incremental feed for at least one phase of one cycle.

As illustrated in Figures 13 and 14, the feeding of stock to hopper 32 occurs in the normal manner, first by depositing an increment in hopper 32 and then by reversing conveyor 38 to feed stock forwardly thereon. As this stock comes to the forward end of conveyor 38, however, both this conveyor and its supply conveyors 30 and 31 will be stopped and conveyor 39 will remain idle during the part of the cycle when it would normally operate to deposit stock in hopper 33, i. e., when it would normally perform the operation illustrated in Figure 8. After the entire feeding system has remained idle for the period of time during which conveyor 39 would normally operate rearwardly to deposit an increment of stock in hopper 33, it is again started up, but with conveyor 39 operating in a forward direction to feed stock toward hoppers 34, 35 and 36, and the feeding of stock to hopper 34 will occur as illustrated in Figure 17, exactly at the same time and in the same amount as though the interruption had not occurred.

Since limit switch 44 of hopper 35 indicates that the supply increments to that hopper have also outrun the rate of utilization of stock by its associated machine, the feeding of stock to hopper 35 is also skipped in this phase of this cycle. Conveyors 30, 31, 38, 39 and 40 will be stopped when stock reaches the forward end of conveyor 40, and after remaining idle during the time an increment of stock would normally be fed to hopper 35, these conveyors will resume operation in the forward direction, and conveyor 41 will also be operated in the forward direction in exactly the same way as though no interruption had occurred. Thus, whenever the limit switch of any of hoppers 32—36 indicates that the particular hopper requires no stock, the operation of the system will be interrupted for the exact time normally required to feed that hopper, and then resumed for feeding of the remaining hoppers exactly as though no interruption had occured.

Now, when phase II occurs, there will also be an interruption of the feed to any given hopper if and when the level of tobacco is so high as to indicate no need for such feed. Thus, assuming that, following the operation of phase I as discussed above and illustrated in Figures 13–17, limit switches 43 and 44 still remain closed as stock is successively deposited in hoppers 32—36 from deposits thereof on conveyors 38—42 as illustrated in Figures 7–12, the operation will be as follows. Conveyor 38 will first deposit its increment in hopper 32 as illustrated in Figure 7. The operation of Figure 8 will not occur, however, since the controlling limit switch 43 will indicate that this hopper is fully supplied, and the apparatus will merely remain idle during the period in which the operation of Figure 8 would otherwise occur. At the end of this period, however, conveyor 40 will be operated in reverse to deposit its increment to hopper 34 as illustrated in Figure 9. All of the conveyors will then remain idle for the period during which conveyor 41 would normally deposit its increment in hopper 35 as illustrated in Figure 10, and conveyor 42 will then deposit its increment in hopper 36 as illustrated in Figure 11.

From the foregoing discussion, it will be seen that if, at any time when feeding would otherwise normally occur into one of the hoppers, that hopper is already fully supplied, the apparatus will simply remain idle for one tempo of incremental feed, and then will resume the exact normal feeding operation scheduled to occur at the end of this tempo. When an interruption of feed to any hopper occurs during phase II of the cycle, it will be evident that the conveyor which would normally be operated in reverse to effect that feed will remain loaded with the increment of tobacco left thereon from phase I. It is also evident that, in the operation of the system through phase I of the next ensuing cycle, this increment will be deposited along with the newly-supplied increment into the hopper if that hopper then requires stock. While this particular hopper will thus receive a double increment of stock, this does not seriously upset the balance of the system. Assuming that stock remains on conveyor 39 because of the fact that it has been prevented from being deposited into hopper 33 by the operation of high-level switch 43, and this hopper still requires no stock when its feeding turn comes in the ensuing performance of phase I of the cycle, the following sequence will occur. As the point in the cycle arrives when conveyor 39 would normally be operated in reverse to deposit stock in hopper 43, conveyors 30, 31, 38 and 39 will remain idle, and this idle period will continue through two tempos, until the condition of stock on the conveyors would normally reach the position illustrated in Figure 16, when the operation of the system will be started up again, exactly as illustrated in Figure 16. Thus, not only is the conveyor which normally operates in reverse to feed the over-supplied hopper interrupted along with conveyors supplying it during the normal interval for feeding of hopper 33, but the operation of the conveying system is also interrupted until such time as stock would normally accumulate in timed sequence to the condition which actually exists, and the entire system then resumes operation by feeding into the next hopper, if that hopper requires feed. The same general principle discussed above will apply in operation of the system regardless of the fact that a number of consecutive hoppers may be skipped. The only difference which may occur in supply of remaining hoppers when one or more are skipped will lie in the fact that, in phase I of the operation, a particular hopper will receive a double supply increment, if it resumes operation after having been skipped in the preceding phase II.

The electrical system by which the apparatus is operated and controlled is illustrated diagrammatically in Figure 25. This system receives its power through lines 100 and 101 under control of master switch 102. Line 101 will hereinafter be designated the supply line and 100 the return line.

When it is desired to start the system in operation to the point where the master feed conveyor 30 and first overhead supply conveyor 31 are supplied with tobacco, the Start-Stop switch 102 is first closed, thereby energizing the undervoltage relay coil UV and closing the two contacts controlled thereby. The uppermost of these contacts will be referred to as UV-1 and the lower as UV-2 hereinafter, and the same system will be applied in referring to contacts controlled by other relays.

Safe Run switch 103 is next closed, and then the switch 104 designated SW. Current will now flow from line 101 through switch 102, line 105, contact UV-1 and line 106 across the closed switch 104 and thence through relay SR to return line 100, thus closing switch contacts SR-1 and opening contacts SR-2 and SR-3. Current will also flow through line 106, switch SW, pilot light PL, normally-closed switch 107 and line 108 to return line 100, lighting pilot light PL to indicate that these switches have been properly closed. Another branch line 109 from switch 104 includes the primary 110 of the transformer energizing photoelectric light beam source 112, and another branch 113 energizes the primary 114 of the circuit of photoelectric cell 115.

As soon as photoelectric cell tube 116 has warmed up to its normal operating temperature, its emission energizes relay coil SP, opening switch 107 in the pilot light circuit and closing switch 121. The light PL is thus extinguished, indicating that the photoelectric cell and other circuit connections are ready for actuation of switch JSW. This jog switch 117 is now closed, establishing a circuit through lines 118 and 119, switch 121, contacts SR-1, switch 103 and relay MF to line 120 and return line 100. The MF switch controls contacts 122 and 123 in the circuit of the master feed motor driving conveyor 30 and the motor driving conveyor 31, and the feed of tobacco is thus started and continued until it reaches a point on conveyor 31 interrupting the light beam acting across the deposited tobacco upon photoelectric cell 115 from photoelectric light source 112. This causes relay SP to be de-energized, releasing switch 107 to closed position, breaking the circuit through relay MF to interrupt the tobacco feed, and again lighting PL to indicate to the operator that the jogging feed is completed and the system is now ready for automatic operation. SW switch 104 and JSW switch 117 are now opened and maintained open during the ensuing operation, and the contacts of relay SR remain in the positions illustrated in Figure 25 while the system is under the automatic control now established by closing SM switch and thus establishing a circuit through lines 125 and 126 and synchronous motor 127 to return line 100.

The starting of motor 127 starts the rotation in a counter-clockwise direction of a series of cams PC-1, TC-1, PC-2, TC-2 . . . TC-5, FMC, SOC and FS, mounted on their shaft 128. These cams in turn control the contacts providing the sequence of steps discussed above. Cams PC-1, PC-2, etc., are probing cams designed to effect interruption of the feed by control of appropriate circuit connections when the hoppers become overloaded as discussed above, and may be ignored while we first consider operation of the timing controls in normal operation of the system.

The motors driving the individual overhead conveyors 38—42 are controlled by relay-actuated separate switches to drive them in forward and reverse, relay CF-1 serving when energized to close contacts 130 and 132 and to drive the first conveyor 38 forwardly and relay CR-1 serving to close contacts 133 and 134 and to drive it in reverse. The switch 135 which controls these contacts may be regarded as a double throw switch, and is so shown for purpose of illustration of its operation. Actually, it may be any desired type of switch or switch system designed to close its lower switch contacts through arcs of rotation of timing cam TC-1 spaced apart at their lead ends 180° and 15° each in length, these latter being indicated in heavy lines in Figure 25. The elements TC-1, etc., indicated as timing cams, may for example be drums carrying contacts which close a circuit through CR-1 through two 15° arcs spaced apart 165° and a different circuit through CF-1 through the intervening 165° arc.

With contact relay SUB-1-1 in the closed position illustrated, and the lower contact of switch 135 controlled by timing cam TC-1 also closed, current may flow through line 101, switch 102, lines 137 and 138, contacts MR, line 139, contacts SR-3, lines 140 and 142, switch 135, line 143, contacts REL-SUB-1-1, and relay CR-1 to return lines 144 and 100, thereby energizing relay CR-1 and closing contacts 133 and 134 to drive conveyor 38 in the rearward direction.

Relays CR-2, CR-3, CR-4 and CR-5, which are controlled by the lower contacts of switches 145—148, respectively, control contacts which operate in a similar way to cause their respective motors to drive conveyors 39—42 in reverse. Since contacts SR-3 and SR-2 are closed by de-energization of relay SR through opening of switch SW, and switches 135, 145, 146, 147 and 148 close their lower contacts through 15° arcs of rotation of the TC cams indicated by the heavy lines on the TC cams, each of conveyors 38—42 will thus be started up in reverse to feed tobacco as illustrated in Figures 1–6, as the stage in rotation of its respective timing cam is reached for rearward feed of its respective conveyor.

Figure 23:
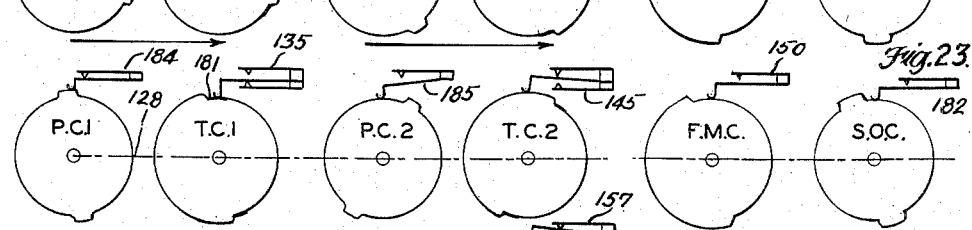

This operation is repeated for 15° arcs of the TC cams spaced 30° apart in rotation of shaft 128 with respect to each of said conveyors until it has deposited its increment of stock into its respective feed hopper, and it is then reversed by the operation of its respective timing cam TC-1, TC-2, TC-3, TC-4 or TC-5 on its respective switch 135, 145, 146, 147 or 148 until phase I has been completed as illustrated in Figures 6 and 23.

Simultaneously with the starting up of conveyor 38 in reverse, the forward feed of conveyors 30 and 31 is resumed as illustrated in Figure 1. This is achieved through the operation of cam FMC, which closes switch contacts 150, which are in circuit with line 151, contacts SR-2, line 152, contacts MR, lines 138, 137, 136 and start switch 102 to line 101, and with line 153, switch 103, line 154, the master feed relay MF, line 155 and line 120 to return line 100. The driving of conveyors 30 and 31 is thus started up by the closure of contacts 122 and 123 by relay MF resulting from rotation of cam FMC to position in which it closes switch 150, and this forward feed will continue as FMC cam rotates, until interrupted either at the position of Figure 6, or in response to emergency conditions as discussed hereinafter.

Figure 19:
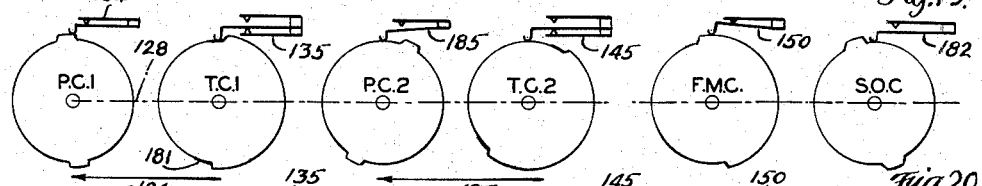
Figures 19 through 24 are diagrammatic views of the positions of the control cams at the successive stages of the feeding cycle.

The simultaneous positions as illustrated in Figures 19 and 25 correspond to those of Figure 1, in which the first increment deposit is occurring in hopper 32. The system will operate in this manner, in the illustrative form shown, for a period corresponding to approximately 15° of rotation of cam shaft 128, at which time cam TC-1 will have rotated to the point where it opens the lower contacts of switch 135 and closes its upper contacts. Current through relay CR-1 is thus cut off and current through CF-1 established. This results from connection of line 142 through 140, SR-3, 139, MR switch, 138, 137, 136 and 102 to line 101 and from line 156 through relay CF-1, line 157, contacts FS and line 120 to return line 100. Establishment of this circuit through FS contacts results from the fact that these contacts have just previously been closed by the rotation of cam FS with shaft 128, closing switch 157 and establishing a circuit through lines 158, 137 and 136 and start switch contacts 102 to line 101, and through line 159, relay FS and line 120 to return line 100.

The opening of the circuit through contacts 133 and 134 and closing of the circuit through contacts 130 and 132 by de-energization of relay CR-1 and energization of relay CF-1, as aforesaid, reverses the motor driving conveyor 38, and establishes the operation of Fig. 2, since all other circuit connections and conveyor driving conditions remain unchanged. Switches 145, 146, 147 and 148 are interconnected with the respective relays CF-2, CR-2, CF-3, CR-3, CF-4, CR-4, CF-5 and CR-5 by lines 162, 163, 164, 165, 166, 167, 168 and 169, in the same manner that switch 135 controls relays CF-1 and CR-1, and these lines are also interconnected with supply and return lines 101 and 100 through the same circuit connections as in the case of relays CF-1 and CR-1.

From inspection of Figures 18–23 and 25, it will be seen that cams TC-2, TC-3, TC-4 and TC-5 trail each other by progressive arcs of 30°. Thus, after forward feed of tobacco by conveyor 38 until its own length is covered and hopper 33 has been supplied by rearward feed of conveyor 39, this conveyor 39 will be reversed to feed forwardly by the operation of cam TC-2 in opening CR-2 contacts 173 and closing CF-2 contacts 172, and this sequence will be repeated with each of conveyors 40, 41 and 42 through successive closing of their controlling switches 174–179 until the system has reached the condition of Figure 6.

Figure 22:
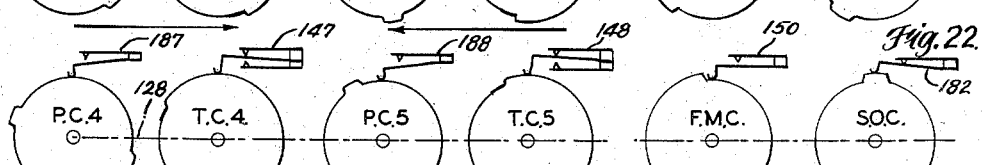

After timing cam TC-5 has energized relay CF-5 and rotated forwardly 15° from that position to deposit tobacco forwardly on conveyor 42 to the position of Figure 6, cam SOC will have reached the position illustrated in Figure 22, and will close switch 182. This switch is connected through line 158 to supply line 101 and through lines 183, master relay MR and line 120 to return line 100. The relay MR is thus energized by closure of switch 182, and MR contacts are opened. Since, as noted above, these contacts are in circuit with the controls for all of the conveyors, the entire system will stop in the position of Figure 6, but timing motor 127 and shaft 128, with their cams, will continue to rotate.

As cam FMC rotates to the position at which it opens switch 150, the circuit through master feed relay MF is opened at this point and will remain open until the cams rotate through 180° to repeat phase I. As cam FS rotates to the position in which it allows switch 157 to open, the circuit through FS relay and FS switch contacts will be opened with the result that all of the forward feed circuits of the motors driving conveyors 38—42 will be opened at this point. The master feed conveyors 30 and 31 will be thus stopped until cam FMC rotates through 180°, and the forward feed of conveyors 38—42 will also be prevented during a similar period.

As cam SOC rotates to a position in which switch 182 is again opened, relay MR will be re-energized, with the result that current will again flow through the circuits controlling contacts CR-1, CR-2, CR-3, CR-4 and CR-5, when cams TC-1, TC-2, TC-3, TC-4 and TC-5 have rotated to positions permitting this to happen by permitting the respective switches 135, 145, 146, 147 and 148 to close their lower contacts. As cam SOC first moves into position to open switch 182 and start phase II, each of cams TC-2, TC-3, etc., will still be in position to maintain the upper contacts of switches 145—148 closed and their lower contacts open. However, cam TC-1 will have rotated to position closing switch 135 through the 15° of arc illustrated at 181 and conveyor 38 will immediately start up in reverse to deposit its tobacco as illustrated in Figure 7. Since each of cams TC-2, TC-3, TC-4 and TC-5 trails its predecessor by 30°, the steps of depositing tobacco from conveyors 38—42 into hoppers 32—36, respectively, will follow each other at intervals of 30° of rotation of cam shaft 128, and the deposit of tobacco in phase II will proceed in the same timed sequence as phase I.

As cam SOC again rotates to position in which it closes switch 182, relay MR will be energized to shut off the entire feeding system, and when SOC again permits switch 182 to open, the remaining cams will have rotated to positions to start the repetition of the sequence of phase I. The deposit of tobacco from conveyors 38—42 will thus be continued through timed periods of 15° of rotation of cam 128, with 15° of delay between successive deposits, in continuous repetition of the aforesaid sequences of phases I and II, until interrupted by manual control or by automatic response to a full hopper. Considering first the automatic control for stopping the feed, this can best be understood in relation to the condition assumed in Figure 14, to wit, that one of the hoppers has received tobacco to the point where it is desirable that it be skipped in the incremental feed.

In addition to the timing cams TC-1, etc., the shut-off cam SOC, the forward motion cam FMC and the forward stop cam FS, the cam shaft 128 carries a number of probing cams PC-1, PC-2, PC-3, PC-4, and PC-5, each closing an associated switch 184—188, respectively in a circuit which operates, under manual control or automatic response, to shut off an increment of feed when required to do so. Probing cam PC-1 maintains switch 184 closed through exactly the period during which feed rearwardly by associated conveyor 38 would normally occur, and operates to disable this conveyor for such feed when conditions are as discussed below. Switch 184 is in circuit through lines 192 and high level limit switch HL-LS-1 with line 193, relay REL-SUB-1 and lines 194 and 195 to return line 100 and through lines 158, 137 and 136 and Start switch 102 with supply line 101. High level limit switches HL-LS-2-5 are similarly in circuit, through their respectively interconnected lines 196—199 with relays REL-SUB-2, -3, -4 and -5, respectively.

Since cams PC-1, etc. close their associated switches 184—188 through exactly the periods when rearward feed of their respective conveyors 38—42 would normally occur, and since limit switches HL-LS-1, etc., complete the closure of these circuits through REL-SUB-1, etc., REL-SUB-1 will be actuated to open contacts REL-SUB-1-1 and prevent energizing of relay CR-1 when the high level condition occurs.

Assume now that phase I has been resumed, and that cam TC-1 has rotated through its rearward feed position as illustrated in Figure 13 and to the forward position in which tobacco has been deposited to the forward end of conveyor 38. Probing cam PC-2 will now have rotated to position in which it closes switch 185, which is in circuit with high level limits switch HL-LS-2, which is switch 43 of Figure 14. Since this switch is now also closed, REL-SUB-2 will be energized and contacts REL-SUB-2-1 opened to prevent energizing of relay CR-2 and closure of contacts 173 which control movement of conveyor 39 in the rearward direction. There will therefore be no deposit of tobacco in hopper 33. Energizing of relay REL-SUB-2 also closes switch contacts REL-SUB-2-2, and these contacts are in circuit through line 202 with MR relay, line 120 and return line 100, and through lines 203, 204, switch HL-LS-2, line 196, switch 185 and lines 158, 137, 136 and Start switch 102 with supply line 101. As noted above, opening of the MR contacts by energization of the MR relay opens the contacts controlling all the conveyors, so the entire system will stop until the circuit through MR relay has again been opened by rotation of cam PC-2 to position in which this cam releases switch 185 to open position, thereby closing MF relay and resuming forward feed of conveyors 30, 31 and 38.

As cam PC-2 now moves to open position to permit resumption of the master feed, timing cam TC-2 moves to position in which it closes the upper contact of switch 135, thus completing the forward feed circuit by energizing relay CF-1 and closing the motor circuit through contacts 172. The forward feed of conveyor 39 will therefore be started and the entire system will follow the same sequence, after skipping feed to hopper 43, as though no interruption had occurred. The feed to hopper 34 will occur in its normal phase I timing.

Assuming now that hopper 35 also has sufficient tobacco to close its high level limit switch HL-LS-4 as the tobacco reaches the forward end of conveyor 40 and probing cam PC-4 rotates into position to close switch 187, the rearward feed of tobacco by conveyor 41 into hopper 35 will be skipped by a system of control operations upon relays REL-SUB-4 and MR as discussed above for conveyor 39 and hopper 2, and the forward feed will then be resumed to hopper 36.

Let us now consider the operation that occurs when a high level switch is closed during phase II. Assuming that switch HL-LS-2 is still closed when probing cam PC-2 closes switch 185 at the point in the cycle when the operation of Figure 8 would normally occur to feed tobacco rearwardly from conveyor 39 into hopper 33, REL-SUB-2 and MR will be energized exactly as discussed above for phase I, with the consequence that the load of tobacco will remain upon conveyor 39 and the entire system be disabled until PC-2 again opens contact 185 and timing cam TC-3 rotates to a position to cause actuation of conveyor 40 in the rearward direction.

Each of the switch combinations which acts to cut off rearward feed to an individual hopper includes, in addition to the high level limit switch HL-LS-1, etc., a switch SW-1F in parallel therewith which may be manually controlled. Thus, if one of the cigarette machines is to be shut down, its switch controlling this parallel line may be closed to cause its hopper to skip every feeding turn until operation is resumed.

A photoelectric cell circuit may be provided for operation to close the circuit controlled by SOC cam to shut the feeding system down in case by some accident tobacco reaches the end of conveyor 42 before SOC cam reaches its shut-off position.

The operation of the system in phase I in response to control by the PC, TC, FMC, SOC and FS cams may be reviewed briefly by examination of Figures 18 through 25. Figure 18 illustrates the general arrangement of these cams on shaft 128 and Figure 19 the positions as the feeding operation of Figure 1 is taking place. As there illustrated, probing cam PC-1 has closed its switch contacts 184 and the lower switch contact of switch 135 is also closed. Rearward feed into hopper 32 will be taking place as illustrated unless hopper 32 contains an excess of tobacco such as to close switch HL-LS-1, in which case such feed will be prevented.

Figure 20:
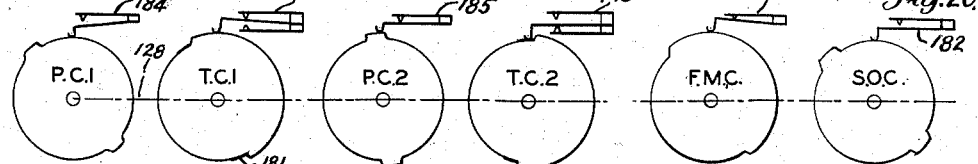

In Figure 20, the cam system has rotated about 30° from the position of Figure 19, and rearward feed to hopper 32 has been completed under control of cam TC-1 and switch 135 and forward feed of conveyor 38 commenced. Conveyor 39 has also been started in the rearward direction, and the system has reached the condition of Figures 2 or 15, depending on whether switch HL-LS-2 is closed.

Figure 21:
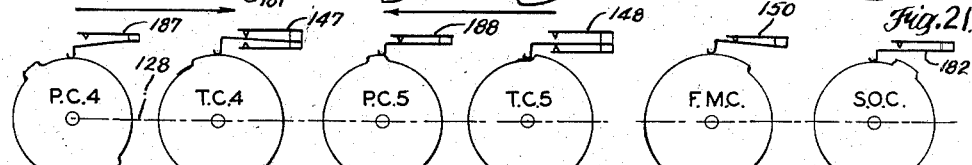

In Figure 21, the system has rotated through a further arc of 90°, to the conditions of Figure 5, and in Figure 22 it has rotated through 30° additional, to the point where cam SOC has closed switch 183 to interrupt the entire feeding system at the position of Figure 6.

Figure 24:
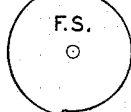

In Figures 23 and 24, the system has rotated through an arc of approximately 180° from Figure 19, cams SOC, FMC and FS having rotated to positions to permit resumption of feeding in the rearward direction only, and probing cam PC-1 having rotated into position in which it protects hopper 32 by again closing switch 184, while cam TC-1 has reached the point where it again closes the lower of switch contacts 135 to cause rearward feed as illustrated in Figure 7, unless prevented by high level switch HL-LS-1. While upper contacts of switches 145—148 are still closed by cams TC2-5 in this position, no forward feed from conveyors 39 through 42 can take place, since the entire forward feeding system is disabled by reason of the position of FMC cam, in opening switch 150.

In the modification of Figures 26—28, there is illustrated a more elaborate system for feeding from a single source two lines of cigarette making machines. As there illustrated, the master feed conveyor 300 delivers stock to the system in the same way as conveyor 30 of the previously-described embodiment, and this stock is discharged upon a master reversing conveyor 301, which in turn delivers it to one or the other of two oppositely transversely extending conveyors 302 and 303 by which it is delivered to conveyors 304 and 305, which correspond to conveyor 31 in the previous form. From conveyors 304 and 305, the stock is fed to systems of conveyors 306 and 307, respectively, which operate identically with system 38—42 of the previous form both in phase I and phase II of their operation.

In the operation of this form, if the first increments of feed are to go to system 306, conveyor 300 will be started up, as will also conveyors 302 and 304, and conveyor 301 will be operated to feed tobacco to the right. As stock is delivered to the system 306, the conveyors of that system will operate in exactly the same sequence as conveyors 38—42 in phase I. At the completion of phase I, however, conveyor 301 will be reversed and conveyors 303 and 305 started up, and phase I will be performed in system 307 at the same time as phase II takes place in system 306. Thus, the master feed continues uninterruptedly first to one system and then to the other and each system completes its phase II while the master feed is operating to provide stock for phase I of the other system.

While the invention has been described only in relation to two specific embodiments, persons skilled in the art will be aware that various modifications and refinements are available, and we therefore wish to have it understood that the invention is not to be limited in interpretation except by the scope of the following claims.

As an example of a refinement which may be employed usefully, the variable speed drive through which the master feed is controlled may in turn be controlled by low level switches within the individual hoppers, through electrical data control mechanism which causes rapid feed when accumulated data indicate that these hoppers require filling up. Similar control may be exercised to slow down the feed through accumulation of data from high level switches, or through operation of high level and low level switches individually.

We claim:

1. In the feeding of loose material to a plurality of supply locations arranged in serially spaced relationship, the process comprising feeding said material to a conveyor system comprising a first conveyor underlying a supply conveyor and overlying one of said locations at its material-receiving end, and succeeding conveyors each underlying at its receiving end the discharge end of the preceding conveyor and overlying its associated supply location, feeding material from each of the conveyors of said system rearwardly as received until a predetermined increment has thus been deposited at its underlying discharge location, and after completion of said incremental rearward feed, feeding material as received by each of said conveyors forwardly until each of said conveyors has fed an increment to its associated discharge location, and a further increment of material has been deposited on each of the conveyors of said system, thereafter depositing the increments established on said conveyors at said locations, and repeating said sequence of steps in timed sequential cycles.

2. In the feeding of loose material to a plurality of supply locations arranged in serially spaced relationship, the process comprising feeding said material to a conveyor system comprising a first conveyor underlying a supply conveyor and overlying one of said locations at its material-receiving end, and succeeding conveyors each underlying at its receiving end the discharge end of the preceding conveyor and overlying its associated supply location, feeding material from each of the conveyors of said system rearwardly as received until a predetermined increment has thus been deposited at its underlying discharge location, and after completion of said incremental rearward feed, feeding material as received by each of said conveyors forwardly until each of said conveyors has fed an increment to its associated discharge location, and a further increment of material has been deposited on each of the conveyors of said system, thereafter depositing the increments established on said conveyors at said locations by rearward feed from said conveyors, and repeating said sequence of steps in timed sequential cycles.

3. In the feeding of loose material to a plurality of supply locations arranged in serially spaced relationship, the process comprising feeding said material to a conveyor system comprising a first conveyor underlying a supply conveyor and overlying one of said locations at its material-receiving end, and succeeding conveyors each underlying at its receiving end the discharge end of the preceding conveyor and overlying its associated supply location, feeding material from each of the conveyors of said system rearwardly as received until a predetermined increment has thus been deposited at its underlying discharge location, and after completion of said incremental rearward feed, feeding material as received by each of said conveyors forwardly until each of said conveyors has fed an increment to its associated discharge location, and repeating said sequence of steps in timed sequential cycles until a desired supply has accumulated at at least one of said locations, and thereafter interrupting said incremental feeding to said locations where the desired supply has been accumulated while continuing the incremental sequential feeding of the remaining locations.

4. In the feeding of loose material to a series of hoppers to provide a continuing supply to a series of operating machines being individually fed by said hoppers, the process comprising feeding said material to a supply conveyor at a rate at least sufficient to maintain the desired individual supply for each of said machines, continuing said feed of said material to a conveyor system comprising a first conveyor underlying said supply conveyor and overlying one of said hoppers at its material-receiving end, and succeeding conveyors each underlying at its receiving end the discharge end of the preceding conveyor and overlying its associated hopper, feeding material from each of the conveyors of said system in timed sequence rearwardly as received for a definite timed interval sufficient only to supply to the underlying hopper a pre-determined increment substantially less than the capacity of the underlying hopper, and after completion of said incremental rearward feed, feeding material as received by each of said conveyors forwardly, until each of said conveyors has fed in similar manner an increment to its underlying hopper and a further increment of material lies upon each of the conveyors of said system, thereafter depositing said last-mentioned increments lying on said conveyors by rearward feed of each of said conveyors, repeating said steps in timed sequential cycles until a desired supply has accumulated at at least one of said hoppers, and thereafter interrupting said incremental feeding to said hoppers where the desired supply has been accumulated while continuing the incremental sequential feeding of the remaining hoppers by continuation of said timed sequential cycle except for the said interruption.

References Cited in the file of this patent

UNITED STATES PATENTS

| 236,192 | Stillman | Jan. 4, 1881 |
| 1,971,716 | Hitchcock | Aug. 28, 1934 |
| 2,529,583 | Adams | Nov. 14, 1950 |
| 2,571,277 | Marrow | Aug. 16, 1951 |
| 2,613,832 | Ogorzaly | Oct. 14, 1952 |

FOREIGN PATENTS

| 628,336 | Great Britain | Aug. 26, 1949 |